Figure 1:
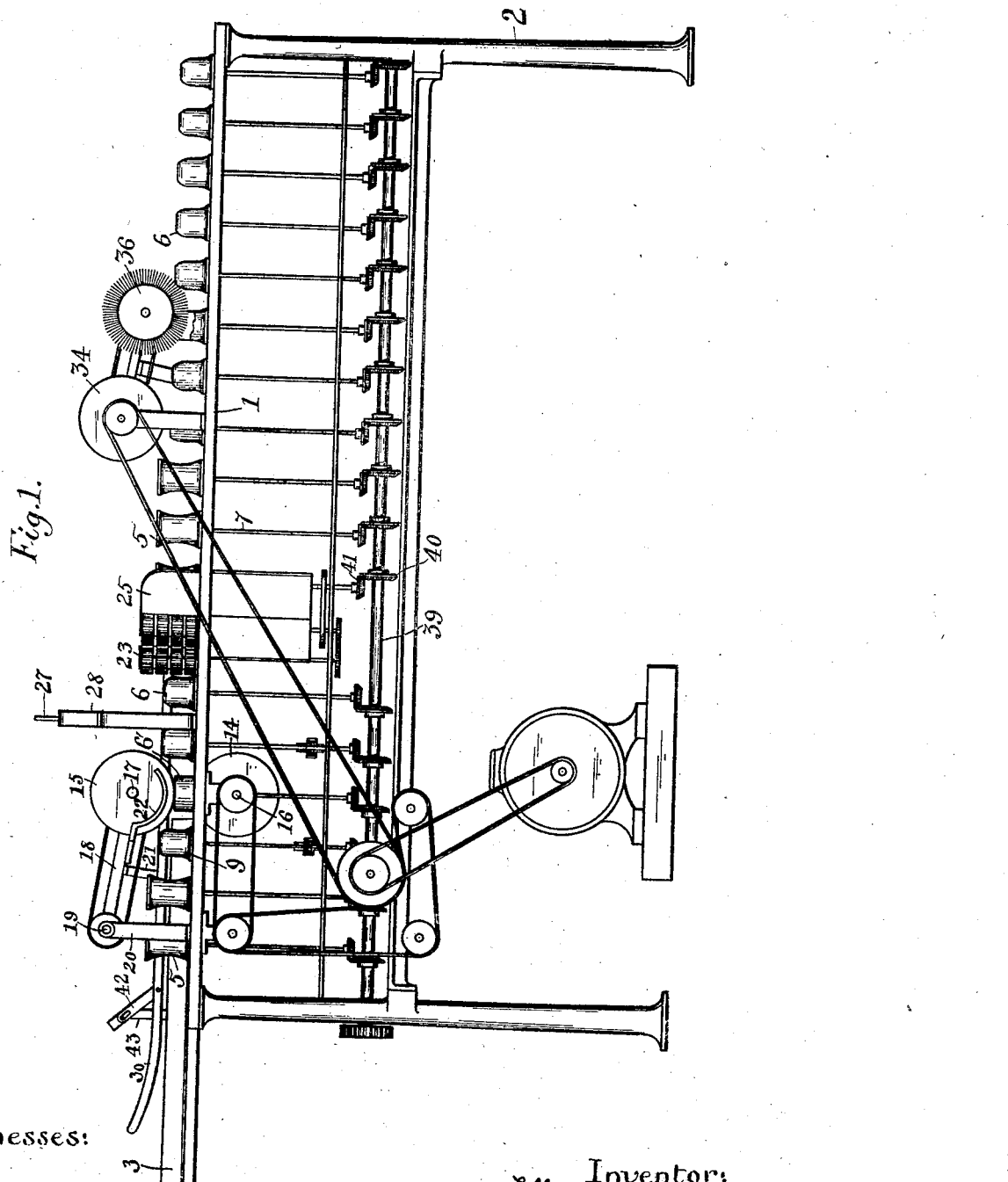

E. T. RUNDLETT.
MACHINE FOR SKINNING FISH.
APPLICATION FILED MAR. 8, 1913.

1,094,597.

Patented Apr. 28, 1914.
3 SHEETS—SHEET 1.

Witnesses:
B. M. Newell
C. B. Creighton

Inventor:
Ellsworth T. Rundlett
by S. W. Bates
Atty

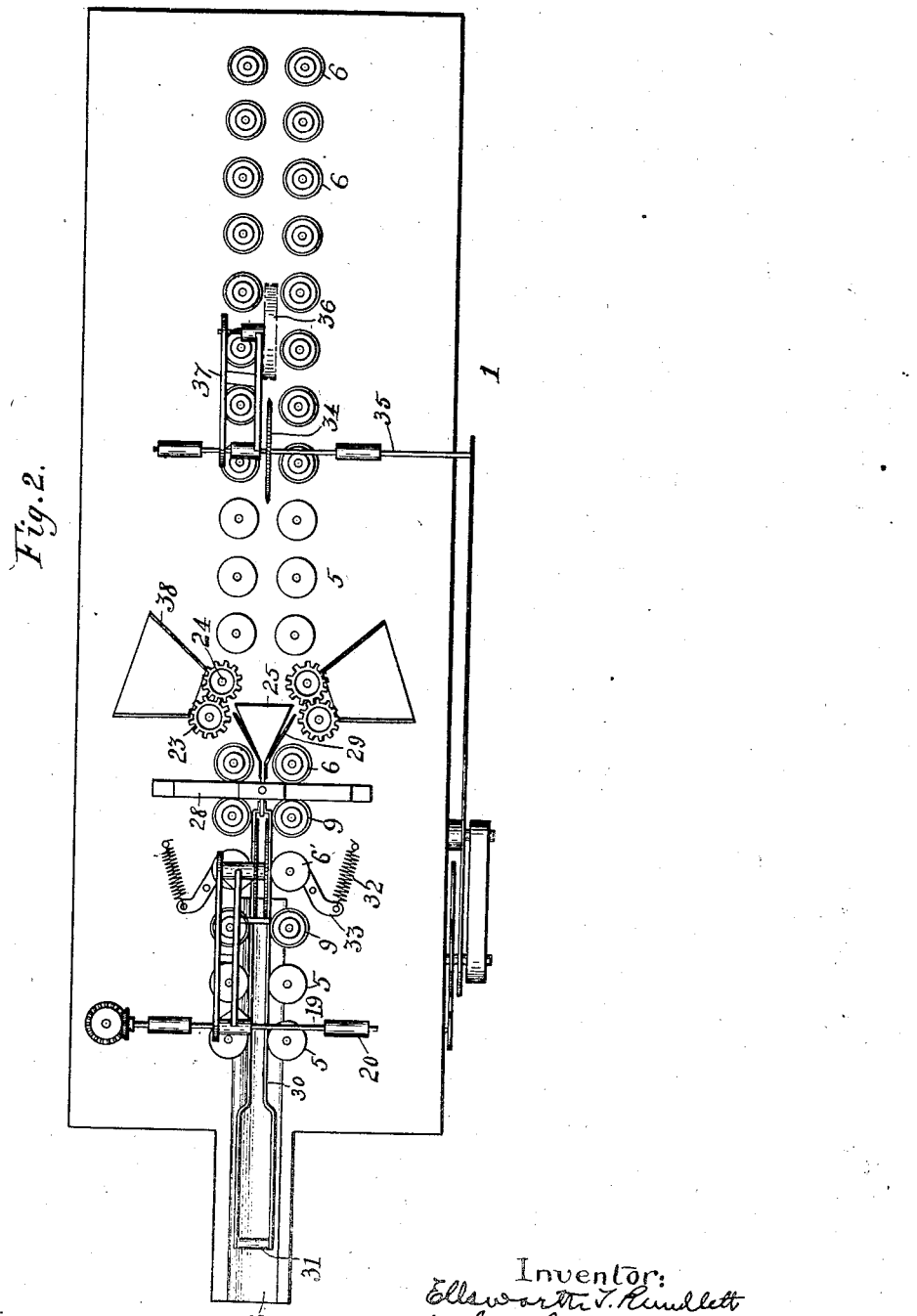

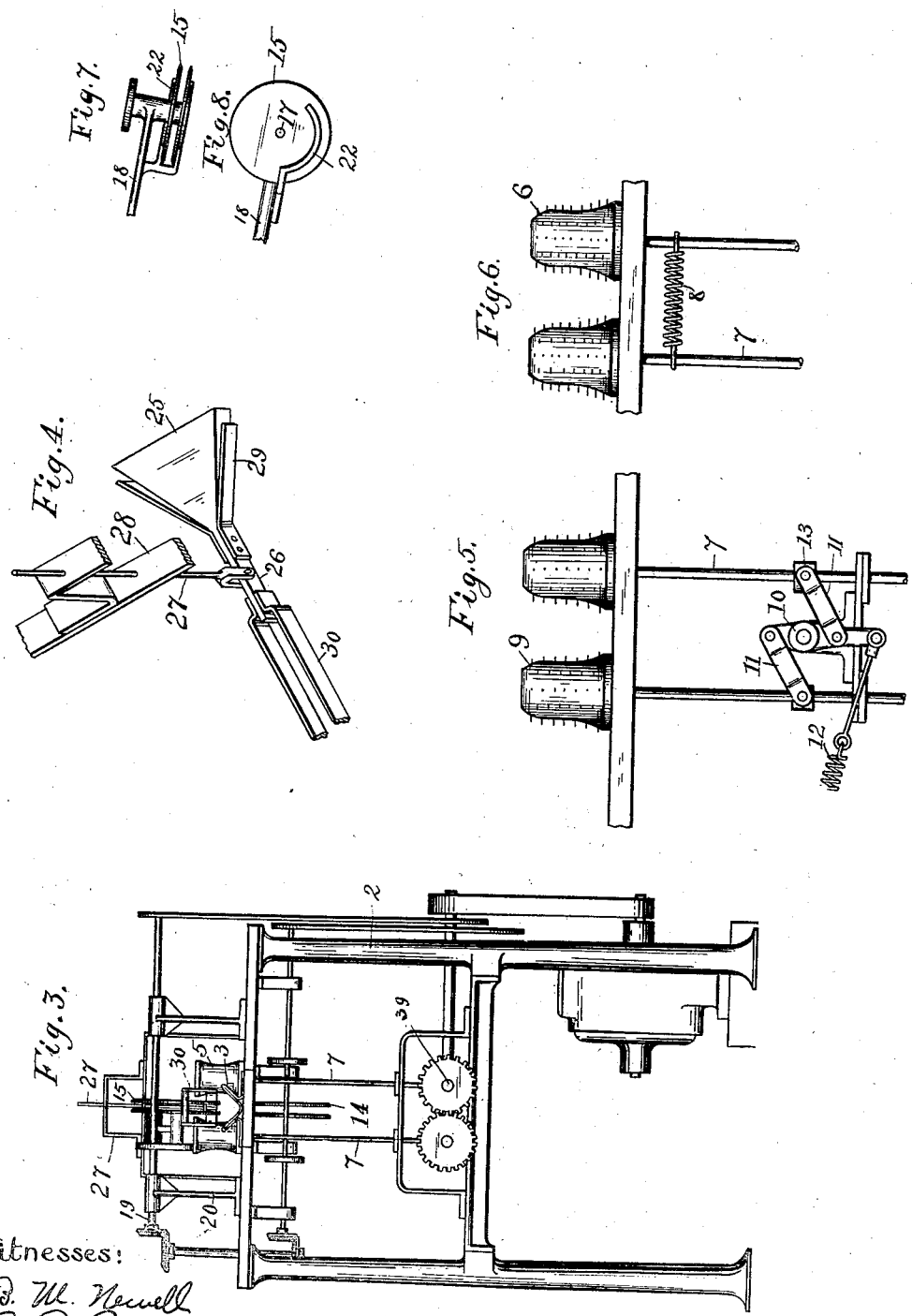

UNITED STATES PATENT OFFICE.

ELLSWORTH T. RUNDLETT, OF PORTLAND, MAINE.

MACHINE FOR SKINNING FISH.

1,094,597.  Specification of Letters Patent. Patented Apr. 28, 1914.

Application filed March 8, 1913. Serial No. 752,998.

*To all whom it may concern:*

Be it known that I, ELLSWORTH T. RUNDLETT, of Portland, in the county of Cumberland and State of Maine, have invented certain new and useful Improvements in Machines for Skinning Fish, of which the following is a specification.

My invention relates to a machine for skinning fish and it is particularly designed to remove the skin from haddock, codfish and other ground fish which have been partially dressed by having their intestines removed.

The invention may best be understood by means of the accompanying drawing, in which—

Figure 1 is a side elevation of a machine embodying my invention, Fig. 2 is a plan of the same, Fig. 3 is an end view of the machine, Fig. 4 is a perspective view of the spreader, Fig. 5 is a detail of certain vertical feed rolls, Fig. 6 is a detail of the ordinary feed rolls, Fig. 7 is a plan of the upper rotary cutters, and Fig. 8 is a side elevation of the same.

In the drawing, 1 represents a suitable bed plate supported on legs or standards 2. The fish is fed through the machine head foremost and preferably resting on its back. For the purpose of guiding the dorsal fin I provide a channel 3 which rests on the bed 1 and holds the dorsal fin central with respect to the feed rolls. The fish is advanced along the bed of the machine by means of a series of vertical feed rolls arranged in pairs and extending the entire length of the operative part of the machine. These rolls are mainly of two kinds. The rolls 5, 5 are hollowed out in the center and expanded at the upper and lower ends so as to embrace the sides of the fish where it is not necessary to open the nape. The feed rolls 6, 6, are shorter than the rolls 5 in order to allow the nape to spread open their contact with the sides of the fish being below the opening of the stomach. These feed rolls are fixed to the upper ends of shafts 7, each pair being so mounted as to have a limited motion away from and toward each other to provide for a yielding grip on the sides of the fish. As here shown, the shafts of all the rolls excepting rolls 9, 9, and 6' 6' are connected with a simple spiral spring 8 which provides the necessary tension. The rolls 9, 9, are placed where accurate guiding is important having a self centering spring connection shown in Fig. 5. This consists of a lever 10 pivoted centrally between the shafts and having at each side of the center a link 11 connecting with a collar 13 on the roll shaft 7. The lower ends of the shafts 7 are sufficiently loose in their bearings to permit of the limited movement of the rolls toward and from each other which is required to give the necessary tension on the sides of the fish. Means are provided for cutting incisions in the fish at each side of the dorsal and anal fins before stripping off the skin. For this purpose as here shown, I provide two pairs of toothed rotary cutters 14 and 15, the former below the bed of the machine and the latter above the same. The cutters 14 are mounted side by side on a shaft 16 and they project a limited distance up through the bed of the machine and in the path of the channel 3 so that the dorsal fin is guided between the cutters and an incision is made on each side of the fin. The anal fin is scored in a similar manner by the upper cutters 15 which are mounted on a shaft 17 journaled in the end of a swinging frame 18 pivoted by means of a shaft 19 at the upper ends of standards 20. A stop 21 limits the downward motion of the cutters 15 and lateral guides 22 limit the depth of the cut to be made in the fish by the rotary cutters. The feed rolls 6' which are opposite the cutters 15 are made shorter than the other rolls so as not to interfere with the guides 22 and tension is applied to them by springs 32 acting on pivoted levers 33 secured to the upper ends of the roll shafts (shown only in Fig. 2).

The skin is removed by means of suitable skinning devices. As here shown, I make use of two pairs of vertically disposed toothed rolls 23, one pair on each side of the line of motion of the fish. These rolls in practice I prefer to form as here shown, namely by series of intermeshing toothed gears mounted on vertical arbors 24. The gears are so positioned to seize the napes or bony formations directly in rear of the gills and to carry them bodily through the rolls. Sufficient space is left between the teeth and between the rolls themselves to allow the bones to pass through. In order to insure the seizure of the napes by the skinning rolls I provide a spreader 25 which spreads the two bones of the nape, guiding each laterally outward into position to be seized by the rolls. The spreader 25 consists as here shown of a triangular block on the end of a bar 26 secured on the lower end of an upright guide rod 27, adapted to slide vertically in transverse cross bars 28. Lateral guides 29 are secured on the sides of the spreader 25 and these guides may be adjusted to accurately guide the napes to the skinning rolls.

Means are provided to keep the napes open during the passage of the fish from the point where it enters the machine to the spreader. For this purpose as herein shown, I provide two parallel rods 30 which are secured to the rear end of the bar 26 and extend back between the rolls to the point where the fish is fed into the machine. The rods 30 rest on the fish as it passes to the spreader and perform the double purpose of holding the fish steadily in place between the rolls and keeping the nape bones spread apart preparatory to being acted upon by the spreader proper. The rear ends of the bars are united by a handle 31, by which the bars are lifted. The forward ends of the rods 30 are steadied and supported when not in use by means of a link 42 connected by a slot and pin with an upright 43 (shown only in Fig. 1.) As each fish is fed in the bars 30 are lifted by the handle 31 and the bars are allowed to rest on the fish lying in the abdominal space and guiding it through the rolls.

Means are provided beyond the skinning mechanism to cut open the blood pocket left in removing the entrails of the fish and of brushing out the abdominal cavity. For this purpose I provide beyond the skinning mechanism and in the line of feed rolls a single overhead rotary cutter 34 on a shaft 35 and a rotary brush 36 journaled on the end of a swinging frame 37.

Openings 38 are made in the bed of the machine in rear of the skinning rolls for discharging the skin after it passes through the rolls and beneath these openings are suitable spouts for carrying off the skins.

Motion is imparted to the parts described by suitable mechanism. As here shown, I make use of a main driving shaft 39 having bevel gears 40 engaging with bevel gears on the lower ends of the roll shafts 7. The cutters and brush are driven by suitable belts in the usual way not necessary to specifically describe.

The operation of my machine is evident from what has been said. The fish is placed back downward in the channel 3 at the front of the machine, the bars 30 being raised and then lowered down to bring their weight on the fish. The guide rolls then carry the fish along by the cutters 14 and 15 where incisions are made on each side of the dorsal and anal fins. When the spreader is reached the two portions of the nape are separated, each being forced laterally outward where it can be seized by the skinning rolls which draw the nape and adhering skin through and strip them cleanly from the sides of the fish, leaving the fins in place. As the fish now continues between the rolls the cutter 34 makes an incision through the blood pocket and the brush follows, brushing out the inside of the fish. The latter is delivered over the end of the bed of the machine.

A machine built according to my invention is capable of skinning fish very rapidly and handling them in a much more sanitary manner than they can be handled by hand. Rapidity is important in the canning industry where it is necessary to get the fish into the cans as quickly as possible.

It is evident that the fish may be fed through the machine otherwise than back downward in which case the skinning rolls would be suitably located in position to seize the napes as the fish passed along through the machine.

It is evident that the napes may be seized and removed by clamping or grabbing devices other than the skinning rolls herein shown.

I claim:—

1. In a machine for skinning fish, the combination of feeding means for advancing the fish, cutters for forming a longitudinal incision each side of the dorsal and anal fins, a spreader for deflecting the nape from the line of motion of the fish and a pair of skinning rolls on each side of and adjacent to said spreader for seizing and removing the nape and attached skin.

2. In a machine for skinning fish, the combination of feeding means for advancing the fish, cutters for forming longitudinal incisions in the back, a spreader for deflecting the nape from the line of motion of the fish and a pair of skinning rolls on each side of and adjacent to the nape for seizing and removing the nape and attached skin.

3. In a machine for skinning fish, the combination of a series of feed rolls for advancing the fish, rotary cutters for forming longitudinal incisions at the sides of the dorsal and anal fins, a spreader having diverging side pieces for deflecting the nape out of the line of motion of the fish and a pair of skinning rolls on each side of and adjacent to said spreader for seizing and removing the nape and attached skin.

4. In a machine for skinning fish, the combination of a series of feed rolls for advancing the fish, means for forming longitudinal incisions at each side of the dorsal and anal fins, a longitudinal guide adapted to bear on the fish between the napes on its passage through the rolls, a spreader at the end of said guide for deflecting the nape laterally, and skinning rolls adjacent to said spreader for seizing and removing the nape and attached skin.

5. In a machine for skinning fish, the combination of feeding means for advancing the fish, cutters for forming a longitudinal incision, each side of the dorsal and anal fins, a pair of skinning rolls and a spreader having a guide positioned to direct the nape into the angle between the rolls.

In testimony whereof I have affixed my signature, in presence of two witnesses.

ELLSWORTH T. RUNDLETT.

Witnesses:
S. W. BATES,
C. B. CREIGHTON.